No. 720,357. PATENTED FEB. 10, 1903.
M. JOACHIMSON.
RADIANT HEAT BATH.
APPLICATION FILED FEB. 18, 1902.
NO MODEL. 3 SHEETS—SHEET 1.
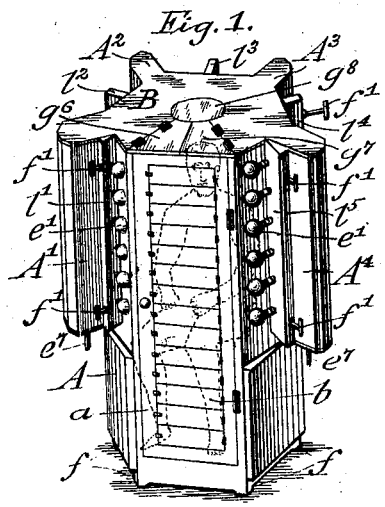
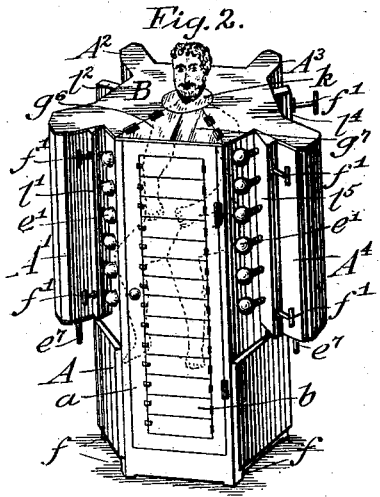
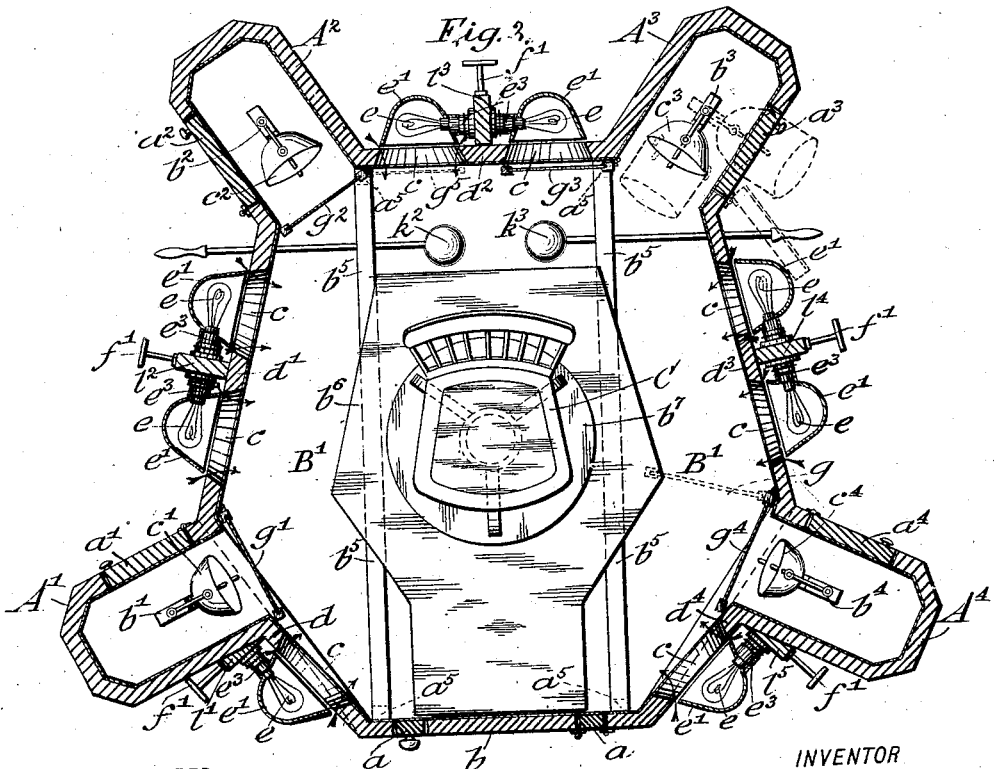
WITNESSES:
Joseph H. Niles
Henry Sulerher
INVENTOR
Martin Joachimson,
BY
Gower Wahle
ATTORNEYS No. 720,357. PATENTED FEB. 10, 1903.
M. JOACHIMSON.
RADIANT HEAT BATH.
APPLICATION FILED FEB. 18, 1902.
NO MODEL. 3 SHEETS—SHEET 2.
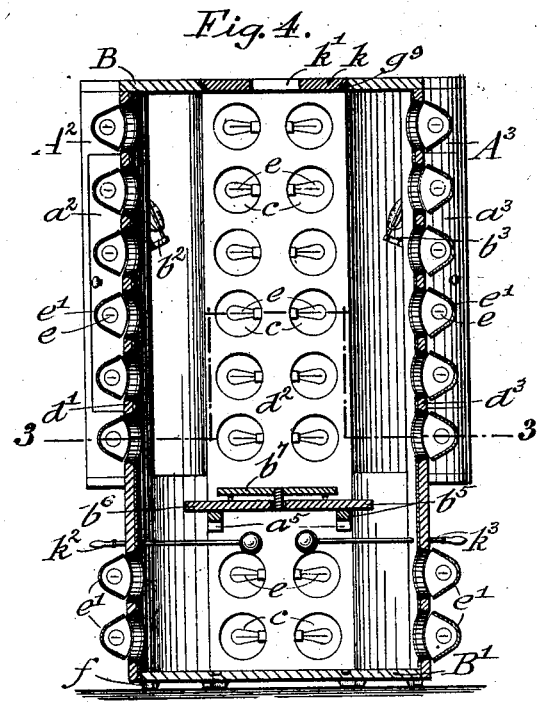
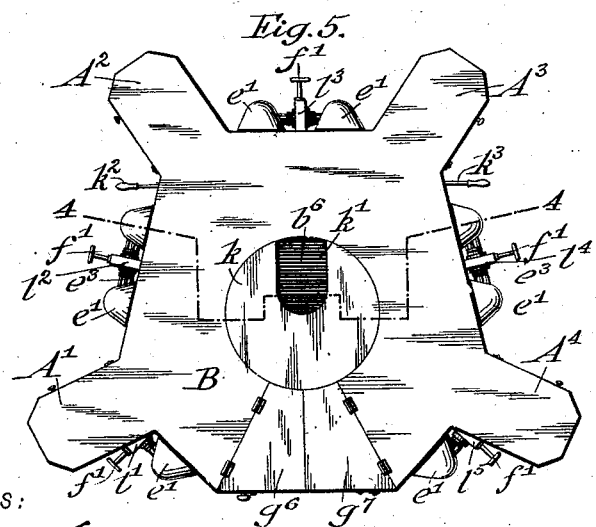
WITNESSES: INVENTOR
Joseph H. Niles Martin Joachimson,
Henry Suhrbier. BY
 ATTORNEYS No. 720,357. PATENTED FEB. 10, 1903.
M. JOACHIMSON.
RADIANT HEAT BATH.
APPLICATION FILED FEB. 18, 1902.
NO MODEL. 3 SHEETS—SHEET 3.
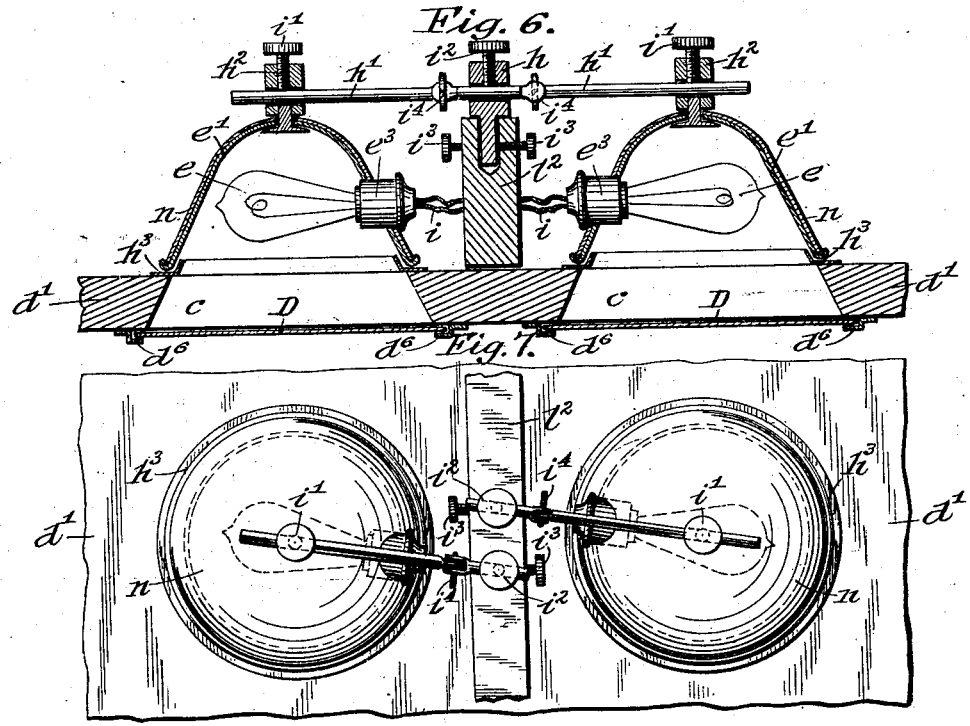
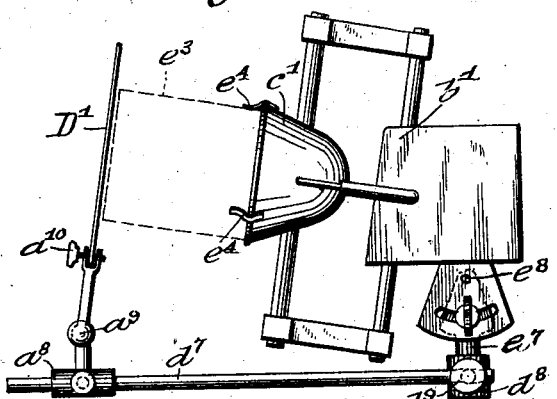
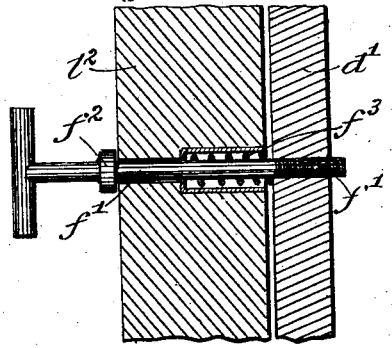
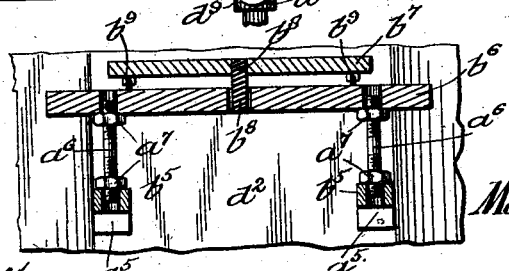
WITNESSES:
Joseph H. Niles
Henry Suhrbier
INVENTOR
Martin Joachimson
BY Jocque Wahle
ATTORNEYS.

UNITED STATES PATENT OFFICE.

MARTIN JOACHIMSON, OF NEW YORK, N. Y., ASSIGNOR OF ONE-HALF TO SOPHIE ROTHSCHILD, OF NEW YORK, N. Y.

RADIANT-HEAT BATH.

SPECIFICATION forming part of Letters Patent No. 720,357, dated February 10, 1903.

Application filed February 18, 1902. Serial No. 94,605. (No model.)

*To all whom it may concern:*

Be it known that I, MARTIN JOACHIMSON, a citizen of the United States, residing in New York, borough of Manhattan, and State of New York, have invented certain new and useful Improvements in Radiant-Heat Baths, of which the following is a specification.

This invention relates to certain improvements in radiant-heat baths or baths in which radiant heat from any suitable source—such, for example, as electric arc or incandescent lights—is employed as an agent for the cure of disease; and the invention consists of a radiant-heat bath comprising a chamber, preferably of polygonal form, provided with openings in its side walls and in the corners, extensions opposite said corner-openings and communicating through the same with the chamber, electric-arc lamps located in said extensions, rows of incandescent electric lamps arranged at the outside of the chamber opposite said openings of the side walls, and reflectors for said lamps for reflecting light from the same through said openings into the chamber. The invention consists, further, in the employment of suitable mirrors by which the corner-openings may be closed when it is desired to cut out the arc-lights. When the mirrors are placed in their open position, the joint action of the actinic rays from the arc and the radiant heat of the incandescent lamps can be employed. The chamber is provided with a door and an opening in the top for the neck of the person sitting in the chamber, and a movable platform is provided within the chamber, so as to permit the use of the cabinet by the patient either in standing or sitting position with the head inside or outside of the chamber; and the invention consists, further, in certain other details of construction and combinations of parts, which will be fully described hereinafter and finally pointed out in the claims.

In the accompanying drawings, Figures 1 and 2 are perspective views of my improved radiant-heat bath, showing the same in use by a person entirely within the cabinet and one with head at the outside of the same. Fig. 3 is a horizontal section, drawn on a larger scale, on line 3 3, Fig. 4, a chair being shown upon the movable platform which is omitted from Fig. 4. Fig. 4 is a vertical transverse section on line 4 4, Fig. 5. Fig. 5 is a plan view of the cabinet shown in Fig. 4. Figs. 6 and 7 are respectively a vertical section and a top view of two lamps and their reflectors, upon an enlarged scale, for showing the adjusting mechanism of the same. Fig. 8 is a side view, on a larger scale, of one of the arc-lamps and its adjusting mechanism; and Figs. 9 and 10 illustrate adjusting means for the lamps and their reflectors and for the movable platform, respectively.

Similar letters of reference indicate corresponding parts.

Referring to the drawings, A represents a chamber, which is preferably constructed in polygonal shape, of suitable wood, and may be lined with glass or enamel at its interior surface. The chamber is made of sufficient height to accommodate a person of normal height in standing position and is preferably provided with suitable supporting-feet $f$. The front wall of the chamber is formed of a hinged door $a$, giving ingress and egress to and from the interior of the chamber, said door being provided with a plurality of hinged panels $b$, affording limited access to the interior when opening of the entire door is not necessary or desirable—as, for example, for giving special local treatment by light from an exterior source. At the corners of the polygonal chamber and opening into the same are arranged upright extensions $A'$ $A^2$ $A^3$ $A^4$, which extend about two-thirds of the height of the chamber from the top downward and in which the arc-lamps are placed. These extensions are provided each with a hinged door in one of its sides, said doors $a'$ $a^2$ $a^3$ $a^4$ giving access to the lamps $b'$ $b^2$ $b^3$ $b^4$ for the purpose of directing or regulating the same. The lamps are preferably provided with reflectors $c'$ $c^2$ $c^3$ $c^4$, of parabolic shape. The side walls $d$ $d'$ $d^2$ $d^3$ $d^4$ of the chamber are provided with openings $c$, of circular or other form, and at the outside of the chamber are arranged a series of incandescent lamps provided with reflectors of a size corresponding to the openings $c$. The incandescent lamps $e$ and their reflectors $e'$ are preferably mounted on a wooden strip or ledge, as $l^2$, that extends between the openings $c$ and is suitably attached to the wall of the chamber. The reflectors are preferably secured firmly to the sockets $e^3$ of the incandescent lamps, and may be provided at their outer side with a reflecting-layer $n$, of asbestos or other suitable non-conductor of heat. As the lamps are arranged exteriorly to the chamber, the patient can move freely at the inside of the same without coming in contact with the lamps and either be injured thereby or cause injury to the lamps.

The extensions A' $A^2$ $A^3$ $A^4$ can be closed by means of hinged mirrors $g'$ $g^2$ $g^3$ $g^4$ when it is desired to cut off the radiant light from the arc-lamps. In Fig. 3 the mirrors $g'$ $g^2$ $g^4$ are shown in position to cut off light from the lamps $b'$ $b^2$ $b^4$. When the mirrors are moved so as to open the extensions, they may be set in median position, as at $g$, or so as to close the adjacent openings $c$, and thereby cut out certain of the incandescent lights, as at $g^5$. When in median position, the heat-rays from both arc and incandescent lamps pass to the patient. The mirrors are preferably double— i. e., with mirror-surfaces at both sides—so that when swung in either position a reflecting-surface is presented to the interior of the chamber.

It is important to ventilate the chamber while the radiant heat is being administered. For this purpose the supporting-ledges are attached adjustably to the wall of the chamber by any suitable means—as, for instance, a screw $f'$, threaded at its lower end in the wall of the chamber and provided with a flange $f^2$, limiting the outward movement of the ledge under the tension of a spring $f^3$, confined in a socket of the ledge and bearing against the chamber-wall, as shown in Fig. 9. Two of these screws $f'$ are preferably arranged one at either end of the ledge, so that by turning the same the distance of the reflectors from the chamber-wall can be regulated, and thereby the passage of air between the reflectors and wall and through the openings $c$ controlled. Each reflector is mounted adjustably on its ledge by any suitable mechanism permitting adjustment in all directions—as, for instance, that shown in Figs. 6 and 7. In this construction $h$ indicates a post rotatably mounted upon the ledge and provided with a bore adapted to receive an arm $h'$, to which the reflector is secured by means of a sleeve $h^2$, adjustable on said arm $h'$ both longitudinally and circumferentially. The reflector itself is preferably secured to said sleeve $h^2$ in such a manner as to be rotatable thereon, as shown. When rotated, the conducting-wires $i$ of said lamp, which are loosely arranged, permit movement of the lamp with the reflector. Suitable thumb-screws $i'$ $i^2$ $i^3$ serve for securing the parts in place. The arm $h'$ is preferably jointed, the parts being secured together by a suitable clamping-screw $i^4$. By this mechanism the lamp and its reflector can be adjusted to the exact position desired. For preventing escape of light at the space between the edge of the reflector and the wall of the chamber and for deflecting the entering air into the reflector, so that the same becomes more highly heated, a guard-ring or deflector $h^3$ is provided, which is secured to the chamber-wall and adapted to extend for a short distance up into the reflector.

The chamber is provided at the interior with two supporting-bars $b^5$, adapted to receive and support a movable platform composed of a base-board or foot-board $b^6$ and a chair-board or auxiliary platform $b^7$, which is provided with a pivot $b^8$ and rollers $b^9$ or other suitable means for mounting the same rotatably upon the base-board. The auxiliary platform is of suitable size to receive a chair C. The bars $b^5$ are preferably supported at their ends detachably upon suitable brackets or blocks $a^5$, attached to the chamber-walls, so as to be removed from the cabinet when desired. The bars are located at such height with regard to the proportions of a person of normal stature that when such person is seated upon the chair his head is above the top B and located at the outside of the cabinet. When the platform is removed and the chair placed upon the floor B' of the cabinet, the person seated upon the chair is entirely within the cabinet. When placed upon the floor B' of the cabinet, the head of the person standing upon the platform is at the outside of the cabinet, and when the platform is removed the head of the person standing upon the floor B' is within the cabinet. For adapting the cabinet to persons of different heights it is preferable to employ adjustable supporting-legs, composed, for example, of threaded rods $a^6$, having screw-nuts $a^7$, said supporting-legs being interposed between the base-board and the bars, as shown in Fig. 10. These legs may also be used between the base-board and floor B', if necessary, according to the height of the person to be treated in standing position.

The top B of the cabinet is provided at its front part, adjacent the door $a$, with a lid or door hinged to the top and preferably made in two sections $g^6$ $g^7$, the opening thereby formed communicating at its inner end with a circular neck-opening, which when not employed is closed by a removable cover $g^8$, supported on a projecting ledge $g^9$ or by any other means. When treating a person with head at the outside of the cabinet, the cover $g^8$ is replaced by a cover $k$, having a recess $k'$, adapted to receive the neck of the person. The construction of the neck-opening and cover in circular form permits turning of the cover $k$ with the person when the latter turns or is turned within the cabinet. The arc-lamps are supported in the extensions each upon an upright rod $e^7$, upon which rod the lamp is pivotally mounted, as at $e^8$, and clamped in position by a clamping-screw $i^5$.

In many cases it is desirable to administer light of a special character—as, for example, that composed of blue rays alone—instead of permitting the entire light from the lamp to fall upon the patient. For this purpose colored screens D, of glass, celluloid, or other suitable material, may be secured by any suitable means, as guides $d^6$, before the openings c. A similar screen D' may be supported before each arc-lamp by means of an arm $d^7$, extending from a sleeve $d^8$, secured by means of a thumb-screw $d^9$ in any desired position upon the rod $d^7$ and carrying a sleeve $a^8$, adjustable on said rod $d^7$ and carrying a clamping member provided with a frictional ball-and-socket joint $a^9$ and a clamping-screw $a^{10}$.

For concentrating the rays from the arc-lamp a tubular shell $e^3$ may be attached by clips $e^4$ to the reflector, and in case it is desired to still further localize the light given out a diaphragm or screen may be employed of similar shape to the screen D', but opaque—as, for instance, of asbestos—and provided with an opening of such size and form as is necessary to permit the projection of light over the limited area desired. If it is desired to color this light, a separate colored screen may also be employed, located adjacent the first, or the opening of the first may be closed by a colored glass attached thereto. When it is desired to screen off a large part of the arc-light rays, the tube $e^3$ may be omitted and a diaphragm, as D', but of asbestos or other non-conducting material and not open in any part, may be used.

As is well known, ozone is a powerful agent in the cure of disease. It is found to be especially so when employed in connection with radiant heat. In the bath so far described, however, the sources of ozone or ozonized air—namely, the electric-arc lamps—are located in extensions and not in the body of the chamber, and it is desirable to provide means for not only producing a large additional quantity of ozone, but for producing the same in the body of the chamber and closer proximity to the patient, and, more important, to produce it by some independent means, so that a heavily-ozonized atmosphere can be obtained for use in connection with light from the incandescent lamps alone when the arc-lamps are shut off by closing the extensions by means of the mirrors $g'$ $g^2$ $g^3$ $g^4$. For this purpose two electrodes $k^2$ $k^3$ are located in the body of the chamber at any suitable point and connected by any suitable conductors with the terminals of an electrostatic generator. The discharge thereby caused between said electrodes generates ozone in considerable quantity, so that the air within the chamber becomes charged therewith and is rendered more powerfully curative and the employment of ozone is rendered independent of the use of the arc-lamps. When both are used, the air becomes quickly charged with ozone and the curative action is accelerated.

The advantages of my improved radiant-heat bath are that the lamps are arranged all outside of the walls of the chamber, so that no injury either to the lamps or to the patient is possible.

Second. The heat rays are not permitted to diffuse throughout the chamber into unemployed portions of the same, but are concentrated and thrown directly by means of the parabolic reflectors directly upon the patient, thereby giving a more rapid action.

Third. A most effective and satisfactory system of ventilating is provided by which the condition of the air within the cabinet and the quantity of ozone contained therein are capable of exact regulation. The air entering the chamber (see arrows in Fig. 3) passes in contact with the heated edge of the reflector, and thence in proximity to the lamp and is thereby heated directly by the heat source before mingling with the body of air within the cabinet, making cold drafts impossible. The guard-rings $h^3$ prevent escape of any light between reflector and wall and serve to deflect the incoming air in uppard direction toward the lamp. By means of the screws $f'$ all the reflectors and lamps of one ledge may be adjusted nearer to or farther from the wall, so as to admit the exact quantity of air desired, the cooler outer air entering principally at the lower half and the heated air at the interior passing out at the upper half of the cabinet. If desired, all ventilation may be shut off by simply screwing down the screws $f'$. Any individual lamp and its reflector may be given any special adjustment desired or entirely removed, and this is accomplished from the outside of the cabinet.

Fourth. The cabinet may be quickly and conveniently arranged for the use of a person of any stature and either in sitting or standing position with the head within or without the cabinet.

Fifth. By means of the colored screens rays of any special character can be obtained or rays of different characters employed simultaneously by placing screens of different colors over different openings.

Sixth. A heavily-ozonized atmosphere can be produced and employed in connection with light from both the arc and incandescent lamps or with lamps of either kind without the other.

Having thus described my invention, I claim as new and desire to secure by Letters Patent—

1. In a radiant-heat bath, the combination, with two light sources, of a double-faced mirror arranged between them and adapted to be swung over either one for cutting off the light from the same, substantially as set forth.

2. In a radiant-heat bath, the combination, with a chamber having extensions, arc-lamps in said extensions, openings, and incandescent lamps, arranged at the outside of the chamber opposite said openings, of pivoted mirrors, one between each extension and the next row of openings, and adapted to be swung into position so as to close either said extension or said openings for cutting off the light from either the arc or incandescent lights at will, substantially as set forth.

3. In a radiant-heat bath, the combination, with a chamber having extensions, arc-lamps in said extensions, openings, and incandescent lamps, arranged at the outside of the chamber opposite said openings, of pivoted mirrors, one between each extension and the next row of openings, and adapted to be swung into position so as to close either said extension or said openings, for cutting off the light from either the arc or incandescent lights at will, said mirrors being double-faced, so as to provide in either case a reflecting-surface for the interior of the chamber, substantially as set forth.

4. In a radiant-heat bath, the combination, with the wall of the cabinet or casing, provided with openings, of lamps arranged outside said openings, reflectors over said lamps, and means for controlling the quantity of air permitted to enter by said reflectors through said openings, so as to regulate the relative proportion of heat to light in said entering air, substantially as set forth.

5. In a radiant-heat bath, the combination, with the wall of the cabinet or casing, provided with openings arranged at different heights, of lamps at said openings, reflectors over the lamps, and means for adjusting said reflectors nearer to or farther away from said openings, whereby a vertical draft may be established and controlled in said cabinet, substantially as set forth.

6. In a radiant-heat bath, the combination, with a cabinet or casing, having rows of openings in its wall, of a supporting-strip arranged between two rows, lamps supported by said strip at said openings, reflectors over said lamps, also supported by said strip, an adjusting-screw in the upper end of the strip, and an adjusting-screw in the lower end of the same, for independently adjusting either the top or bottom toward or away from the casing, substantially as set forth.

7. In a radiant-heat bath, the combination, with a cabinet or casing, having rows of openings in its wall, of a supporting-strip, arranged adjacent said openings, lamps supported by said strip at said openings, reflectors for said lamps, and means for adjusting each reflector and lamp independently of the others nearer to or farther away from its opening, substantially as set forth.

8. In a radiant-heat bath, the combination, with a cabinet or casing, provided with openings in its walls, of lamps arranged at said openings, outside the walls, reflectors over the lamps, and deflectors between the casing and said reflectors, substantially as set forth.

9. In a radiant-heat bath, the combination, with the cabinet or casing, of a lamp, a reflector for the same for directing the light within the casing, a screen of opaque and heat-insulating material arranged in front of the lamp and reflector, and means for adjusting said screen toward and away from the lamp, and means for adjusting the same into vertically-inclined position, substantially as set forth.

10. In a radiant-heat bath, the combination, with the cabinet or casing, of a lamp, a reflector for the same for directing the light within the casing, a screen of opaque and heat-insulating material arranged in front of the lamp and reflector, means for adjusting said screen toward and away from the lamp, means for adjusting the same into vertically-inclined position, and a tubular shell between said reflector and screen for concentrating the light and heat upon the latter, substantially as set forth.

In testimony that I claim the foregoing as my invention I have signed my name in presence of two subscribing witnesses.

MARTIN JOACHIMSON.

Witnesses:
JOSEPH H. NILES,
HENRY SUHRBIER.